United States Patent
Hagiwara et al.

(10) Patent No.: US 7,093,142 B2
(45) Date of Patent: Aug. 15, 2006

(54) METHOD, APPARATUS AND PROGRAM FOR USER-DETERMINED OPERATIONAL STATE OF A PORTABLE COMPUTER PRIOR TO DETACHMENT

(75) Inventors: Mikio Hagiwara, Yamato (JP); Eitaroh Kasamatsu, Sagamihara (JP); Mizuho Tadakoro, Yamato (JP)

(73) Assignee: Lenovo Pte. Ltd., Singapore (SG)

( * ) Notice: Subject to any disclaimer, the term of this patent is extended or adjusted under 35 U.S.C. 154(b) by 290 days.

(21) Appl. No.: 10/337,674

(22) Filed: Jan. 7, 2003

(65) Prior Publication Data

US 2004/0133715 A1  Jul. 8, 2004

(30) Foreign Application Priority Data

Jan. 10, 2002  (JP)  .............................. 2002-003632

(51) Int. Cl.
G06F 1/26 (2006.01)
(52) U.S. Cl. ...................... 713/300; 323/318; 713/323; 713/320
(58) Field of Classification Search ...................... None
See application file for complete search history.

(56) References Cited

U.S. PATENT DOCUMENTS 6,636,912 B1 * 10/2003 Ajanovic et al. ........... 710/105
6,665,163 B1 * 12/2003 Yanagisawa ................ 361/103
6,665,765 B1 * 12/2003 Tang et al. .................. 710/304
6,823,516 B1 * 11/2004 Cooper ....................... 718/108
6,883,105 B1 *  4/2005 Dutton ....................... 713/323

FOREIGN PATENT DOCUMENTS

| JP | 62-251863 | 11/1987 |
| JP | 08-328698 | 12/1996 |
| JP | 09-163043 | 6/1997 |
| JP | 10-275034 | 10/1998 |
| JP | 11-065720 | 3/1999 |
| JP | 11-085326 | 3/1999 |
| JP | 2000-357079 | 12/2000 |
| JP | 2001-209466 | 8/2001 |
| JP | 2000-298537 | 10/2004 |

* cited by examiner

*Primary Examiner*—Lynne H. Browne
*Assistant Examiner*—Anand B. Patel
(74) *Attorney, Agent, or Firm*—Sawyer Law Group LLP

(57) ABSTRACT

The present invention facilitates the operational management and usability of a portable computing device by providing an apparatus, method and program product to allow a user to select the operational and power state of a device operably connected with a computer and the power state of the computer prior to removing the computer from an apparatus such as a docking station.

20 Claims, 7 Drawing Sheets

| POWER STATE | APM | ACTUAL STATE | RETURN CONDITION TO S0 |
|---|---|---|---|
| S0 | OPERATIONAL | OPERATIONAL STATE | |
| S1<br>S2 | STANDYBY | POWER OFF SOME PERIPHERAL DEVICES | OCCURRENCE OF PREDETERMINED EVENT |
| S3 | SUSPEND | STORE OPERATION STATE IN MEMORY AND POWER OF PERIPHERAL DEVICES | OCCURRENCE OF PREDETERMINED EVENT |
| S4 | HIBERNATION | STORE OPERATION STATE IN HDD AND POWER OFF MAIN PORTION | OCCURRENCE OF PREDETERMINED EVENT |
| S5 | SoftOFF | POWER OFF ALL BUT POWER MANAGEMENT PORTION OF CORE CHIP | POWER SWITCH ON |
| G3 | MechOFF | POWER OFF POWER MANAGEMENT PORTION | POWER SWITCH ON |

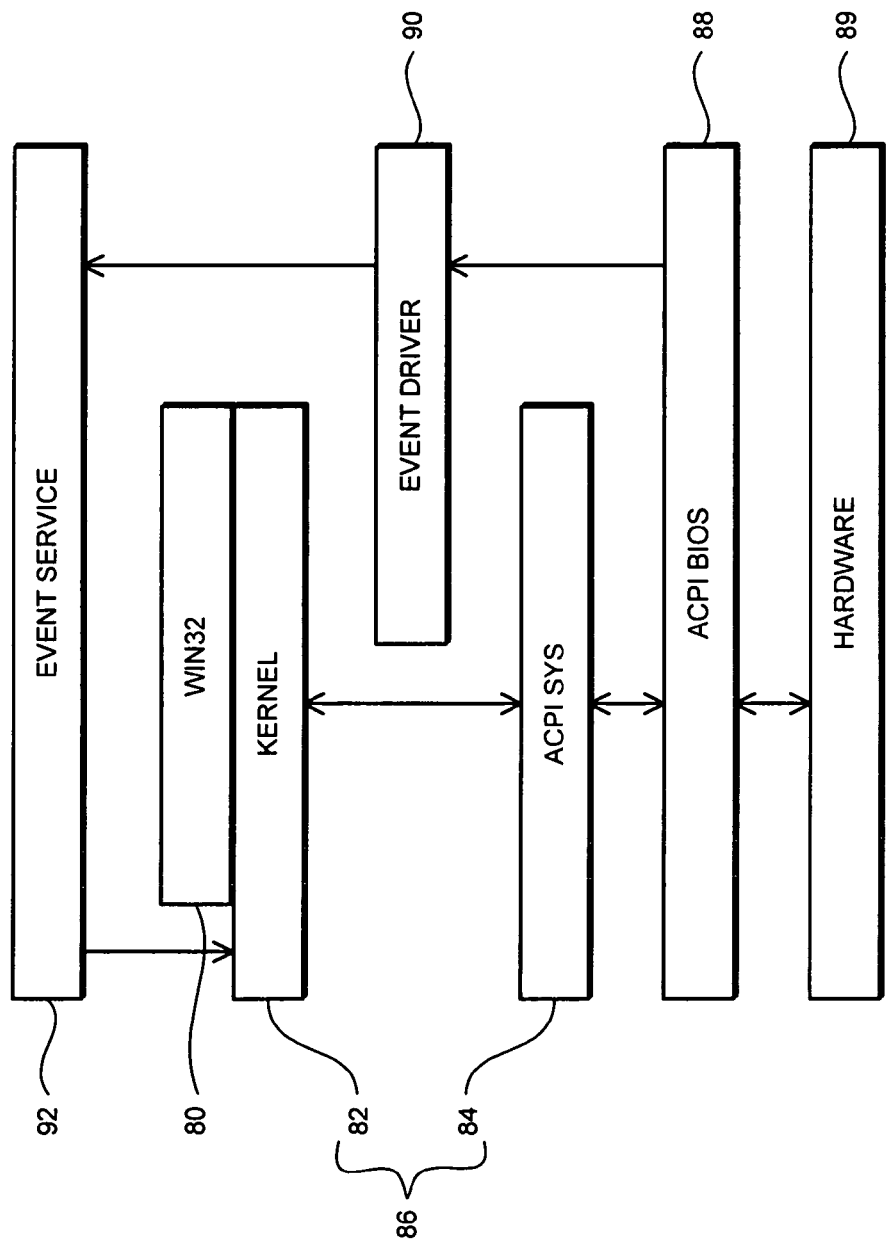

| POWER STATE | APM | ACTUAL STATE | RETURN CONDITION TO S0 |
|---|---|---|---|
| S0 | OPERATIONAL | OPERATIONAL STATE | |
| S1 S2 | STANDYBY | POWER OFF SOME PERIPHERAL DEVICES | OCCURRENCE OF PREDETERMINED EVENT |
| S3 | SUSPEND | STORE OPERATION STATE IN MEMORY AND POWER OFF PERIPHERAL DEVICES | OCCURRENCE OF PREDETERMINED EVENT |
| S4 | HIBERNATION | STORE OPERATION STATE IN HDD AND POWER OFF MAIN PORTION | OCCURRENCE OF PREDETERMINED EVENT |
| S5 | SoftOFF | POWER OFF ALL BUT POWER MANAGEMENT PORTION OF CORE CHIP | POWER SWITCH ON |
| G3 | MechOFF | POWER OFF POWER MANAGEMENT PORTION | POWER SWITCH ON |

FIG. 4

```
Device(DOCK)[

//
    // Hot undock function
    //
    Method( _EJ0, 1)[
        // Release connection.
    }

//
    // Warm(S3) undock function
    //
    Method( _EJ3, 1){
        // Set to release connection after transiting to S3.
    }

//
    // Warm(S4) undock function
    //
    Method( _EJ4, 1){
        // Set to release connection after transiting to S4.
    }
}
```

*FIG. 6*

| USER SELECTED UNDOCK FORM | _EJ0 | _EJ3 | _EJ4 |
|---|---|---|---|
| HOT UNDOCK | ○ | ○ | ○ |
| TRANSIT TO STANDBY WARM UNDOCK | × | ○ | ○ |
| TRANSIT TO HIBERNATION WARM UNDOCK | × | × | ○ |

*FIG. 7*

METHOD, APPARATUS AND PROGRAM FOR USER-DETERMINED OPERATIONAL STATE OF A PORTABLE COMPUTER PRIOR TO DETACHMENT

CROSS-REFERENCE TO RELATED APPLICATIONS

This application claims the benefit under 35 U.S.C. §119 of Application No. 2002-003632, filed Jan. 10, 2002 in Japan, the entire contents of which is incorporated herein by reference.

BACKGROUND OF THE INVENTION

1. Field of the Invention

The present invention relates to computers and information handling systems, and more particularly to computers employing function extension apparatuses, such as a docking station.

2. Description of Related Art

It is known that a personal computer device (PC) may be of many forms, including a desktop, a personal digital assistant (PDA), a laptop, a notebook, and similar. In many of the portable forms, the personal computer devices (PCs) typically have limited facilities and functions as a result of the interest in reducing the size and weight of these portable devices. One approach to assist in providing a user additional features and functionality for these portable devices has included making available a docking station device. By employing the docking station, a user is able to use functions and communicate with additional peripherals that are not provided for or with the portable PC alone. The user simply mounts the portable PC on the receiving docking station, and operably connects the portable PC to various devices through the docking station.

However, in docking a portable PC to a docking station, the power state of the portable PC is typically affected. For instance, when an operable docked portable PC is undocked from a docking station, a "hot undocking" results. Similarly, when a docked portable PC is a sleep state and is undocked from a docking station, a "warm undocking" results.

Although the hot undocking is expedient to a user, as the PC can be undocked from the docking station instantly after stopping the use of an extension function via the docking station or while the PC is still in the operational state, in certain situations the hot undocking may have detrimental results.

By way of example, in the situation where a user first mounts a portable PC on a docking station, then works from a large external display and keyboard, then removes the portable PC from the docking station at the end of the work session, and then moves to another location while carrying the portable PC, the portable PC maybe detrimentally affected. In this example, if the portable PC is in the operational state, the hard disk unit of the portable PC is also in the operational state.

Since the hard disk unit is sensitive to vibration or shock, the carrying of the operational portable PC by the user may inadvertently expose the portable PC to damage. Hence, it is recommended to avoid the operational state of the portable PC in carrying the portable PC because there exists the possibility that the hard disk may be subject to vibration or shock damage if the portable PC is bumped or dropped. Therefore, it is instructive that the user must make the effort of first setting the portable PC to be in the sleep state (i.e., sleep mode) to in effect stop the hard disk unit before carrying the portable PC, even if the portable PC is undocked from the docking station. A typical portable PC may be manually placed in a sleep state, or may be automatically placed in a sleep state if the user does not operate the keys of the portable PC for a predetermined period of time. However, a user may often be unable to manually place the portable PC in to a sleep state due to time constraints, and, similarly, the period of time needed to lapse before a portable PC automatically enters a sleep state typically exceeds the time constraints facing an active user.

By way of further example, even if a user is able to successfully undock a portable PC in a sleep state (i.e., a warm undock) such may be less than desirable by the user as the user may desire to continue working from the resources available on the portable PC, which are unavailable following undocking.

It is also known that certain operating systems resident on a PC may automatically detect the power state of the PC when undocked from a docking station, without prompting from or interference to a user. Examples of such operating systems (OS) include those manufactured by Microsoft Corporation, Redmond Wash., for instance: Windows® 98, Windows® ME, Windows® XP, and Windows® 2000. However, these OS do not assist a user in overcoming the aforementioned problems where the user selects to remove the PC from an extension apparatus, such as a docking station.

In Published Unexamined Patent Application No. 2001-167038, there is disclosed means for resolving nonconformity at the next resume when the PC is undocked in the sleep state from the docking station. Also, in Published Unexamined Patent Application No. 2000-339071, it is disclosed that the PC is equipped with an indicator for notifying the user that the PC is in a suspend state so that the PC can be removed in the suspend state from the extension apparatus. However, similarly, neither of these references assists in overcoming the aforementioned problems where the user selects to remove the PC from an extension apparatus, such as a docking station.

SUMMARY OF THE INVENTION

Accordingly, there is a need for an method, system and apparatus that overcomes the problems discussed above. With the foregoing discussion in mind, it is a purpose of the present invention to provide a method, system and apparatus for enhanced usability of a portable PC at the time of undocking the portable PC from a function extension apparatus equipped with a device. By providing said functionality and method, a user is able to select a predetermined state of the device at time prior to removing the PC from the function extension apparatus, such that when the PC is removed from the function extension apparatus, the device transitions to the user's pre-selected state.

In one embodiment of the present invention, a computer is detachably connected to a function extension apparatus and equipped with at least one device, such as a display. This computer comprises selection means for allowing a user to select a state of the device prior to a PC being removed from the function extension apparatus, and a transition means for making the predetermined device transit to a selected state set by the selection means when the computer is removed from the function extension apparatus.

As used herein, the previously defined terms encompassing a personal computer device, (including but not limited to PC, computer, portable PC, notebook computer, laptop, PDA, and note-type PC) may be used interchangeably.

The function extension apparatus is preferably an apparatus that is configured to be detachably connected to the computer, while providing the functional capability to extend (or append) the functions of the computer. By way of example, in a preferred embodiment, the function extension apparatus is a docking station.

The device operably connected with the computer (also used herein as a "predetermined device") may be a liquid crystal display unit or a hard disk unit for instance. The state of the device may be (a) an operational state of the device (e.g., operable state or inoperable state) or (b) a power state of the device (e.g., power in state, power cut-off state, and power saving state). Preferably, the user can select in advance the state of the device when the computer is removed from the function extension apparatus, for example, the inoperable state or power cut-off state. As used herein, the term "undock" includes the case where the function extension apparatus is a docking station such that the removal of a PC from the docking station would be described by an "undocking" action, however the term "undock" is not necessarily limited to an action involving a docking station.

The typical computer is removed from the function extension apparatus after the transition means makes the predetermined device transition to a selected state set by the selection means, but may be removed before the end of transition by the transition means for making the predetermined device transition to the selected state set by the selection means. Preferably, the transition means makes the predetermined device transition to the selected state set by the selection means, depending on an event associated with removal of the computer from the function extension apparatus.

In this manner, when the computer is removed from the function extension apparatus, the predetermined device operably connected in the computer automatically transitions to the state selected in advance by the user (e.g., the operation sleep state, power cut-off state, or power saving state) thereby enhancing the usability of the computer following the removal of the computer from the function extension apparatus.

In a preferred embodiment, the computer of the present invention is detachably connected to the function extension apparatus. The computer comprises a selection means for allowing the user to select a power state of the computer prior to the computer being removed from the function extension apparatus, and a transition means for making the power state of the computer transition to a selected state set by the selection means when the computer is removed from the function extension apparatus.

Preferably, the power states of the computer correspond to an operational state, a sleep state and a suspend state of the computer. The sleep state of the computer involves the power states S1 to S4 (e.g., standby state, suspend and/or hibernation state; reference FIG. 4). The sleep state may involve various power saving states for the computer, besides the states S1 to S4. By placing the computer in a predetermined power state, an electrical appliance such as a hard disk unit equipped in the computer may attain a full operational state, a partial operational state, a suspend state, or a sleep state. For example, it is known that a hard disk unit has greater vibration resistance or shock resistance in the suspend state such that there exists increased safety in carrying the computer in such a state. Accordingly, for a computer that is usually removed from the function extension apparatus, when the user carries the computer to another place, it is preferred that the user selects the sleep state as the power state of the computer prior to the removal of the computer from the function extension apparatus.

In another embodiment, the present invention includes an operating system running cooperatively with BIOS on a computer, where the computer is detachably connected to a function extension apparatus. Preferably, the computer of the present invention comprises a selection means for allowing the user to select a power state of the computer prior to removing the computer from the function extension apparatus, and a creating means for creating BIOS with respect to power control that is presented to the operating system based on a selected state set by the selection means.

By way of example, the operating system (OS) of the computer may be Windows® 98, Windows® ME, Windows® XP, Windows® 2000 or Windows® NT (manufactured by Microsoft Corp.), or AIX, Unix®, and Linux. Preferably, the operating system and the BIOS of the present invention (with respect to power control) conform to the ACPI (Advanced Configuration and Power Interface) standards.

In one aspect, where the operating system determines that the computer of the present invention is removed from the function extension apparatus by referring to the BIOS (Basic Input/Output System) with respect to power control created by the creating means, the power state of the computer is changed on the basis of the BIOS with respect to power control. For example, if the processed content of the power state in the BIOS with respect to power control involves placing the computer in the sleep state, the computer is placed in the sleep state, when removed from the function extension apparatus. If the typical computer operates in the sleep state, the electrical appliance such as a hard disk unit equipped in the computer is placed in the suspend state. As a result, the hard disk unit has increased vibration resistance or shock resistance in the suspend state, and is adapted to the movement of the computer carried by the user.

Preferably, the creating means makes a determination as to whether or not each function defined in a source program of the BIOS (with respect to power control), based on the selected state set by the selection means, and changes the source program based on the determination to make the changed source program the BIOS with respect to power control. The creating means creates the BIOS with respect to power control efficiently by employing the source program as a suitably produced program to change a portion of the source program appropriately, rather than creating the BIOS from the first step.

Preferably, the source program comprises the first, second and third functions, where the first function involves a processing with respect to power control corresponding to removal of the computer in an operational state of the computer, the second function involves a power supply processing corresponding to removal of the computer in a standby state of the computer, and the third function involves a power supply processing corresponding to removal of the computer in a hibernation state of the computer, and the creating means makes a determination as to whether or not each function is present, based on the selected state set by the selection means. In some operating systems, it is preferred to disable certain functions such that the operating system may not refer to such function or functions as executable, such that the specific function may be deleted in the BIOS with respect to power control, or the initial character of the function name as described in the BIOS with respect to power control may be changed.

Preferably, the creating means creates the BIOS with respect to power control to enable the operating system to refer to the first, second and third functions, when the selected state set by the selection means corresponds to the operational state of the computer. Furthermore, preferably, the creating means creates the BIOS with respect to power control to enable the operating system to refer to the second and third functions, when the selected state set by the selection means corresponds to the standby state of the computer.

The power control process for the computer when removed from the function extension apparatus is decided by the operating system, depending on a mounted form indicated by the BIOS. Typically, in the case where the BIOS has a function regarding the removal (when the function extension apparatus is the docking station, the removal is called "hot undocking") in the operational state of the computer, the OS performs a removal process in the operational state of the computer. In the case where the BIOS has a function regarding the removal (when the function extension apparatus is the docking station, the removal is called "warm undocking") in the sleep state of the computer, the Operating System performs a removal process in the sleep state of the computer. The power control process when the BIOS has both the functions for the processes regarding the operational state and the sleep state of the computer is different depending on the operating system. For example, in the case where the operating system is Windows® 98 or Windows® ME, the removal process in the operational state of the computer is performed, but the removal process in the sleep state is not performed. On the other hand, in the case where the operating system is Windows® 2000 or Windows® XP, which process is performed in the operational state or the sleep state of the computer depends on the remaining amount of battery. If the remaining amount of battery is sufficient, the removal process in the operational state is performed, while if the remaining amount of battery is small or none at all, the removal process in the sleep state is performed.

Thus, for the present invention, given certain specific operating systems, the power state of the computer when removed from the function extension apparatus is controlled in accordance with the remaining amount of battery, whereby another power control process that is different from the power control process corresponding to the user selection must be utilized. To deal with such situations, the OS is presented with the BIOS having the function of another power control process as an executable, along with the function of the power control process corresponding to the user selection, whereby the OS can perform the processing with respect to power control different from the user selection depending on the situation.

In another embodiment of the present invention, a control method for a computer is provided where the computer is detachably connected to a function extension apparatus and operably connected with at least one device. The control method for computer includes a selection step of allowing the user beforehand to select a state of the device when the computer is removed from the function extension apparatus, and a transition step of making the predetermined device transition to a selected state set at the selection step when the computer is removed from the function extension apparatus.

In another embodiment of the present invention, a program for a computer is provided, where the computer has an operating system running cooperatively with BIOS and is detachably connected to a function extension apparatus. The program of the present invention executes: a selected state reading step of reading a user-preselected state about a power state of the computer from a nonvolatile memory device when the computer is removed from the function extension apparatus, and a creating step of creating BIOS with respect to power control based on the selected state read at the selected state reading step.

Preferably, the creating step includes a source program reading substep of reading a source program from the ROM as a basis for changing the BIOS with respect to power control, and a source program changing substep of changing the source program read at the source program reading substep based on the selected state read at the selected state reading step to make the changed source program the BIOS with respect to power control. The nonvolatile storage device is the CMOS, for example, and the ROM where the source program is written is the flash ROM, for example. The program is executed, for example, as the POST (Power On Self Test) process from the time when the computer is powered on to the time when the operating system is started.

It will be readily apparent to those in the field, that the term "program" may comprise or be configured to be software code, hardware circuitry, firmware, method steps, programming code, programming instructions, and the like, in any combination such that the term is not necessarily limited to solely software per se.

BRIEF DESCRIPTION OF THE DRAWINGS

Other aspects, features, and advantages of the present invention will become more fully apparent from the following detailed description, the appended claims, and the accompanying drawings in which:

FIG. 3 is a system configuration diagram of the portable PC of FIG. 1, according to an embodiment of the present invention;

FIG. 4 is a table representing a correspondence between each power state S0 to S5 and G3 in the portable PC and each power state as defined in the APM standard, according to an embodiment of the present invention;

FIG. 6 is a list outlining a source program of ACPI BIOS for defining the power state at the time of undocking the portable PC from the docking station, according to an embodiment of the present invention; and, FIG. 7 is a table representing the functions presented by BIOS as functions to be executed to the OS upon a user selection for the power state of the portable PC at the time of undocking the portable PC, according to an embodiment of the present invention.

DETAILED DESCRIPTION

Figure 1:
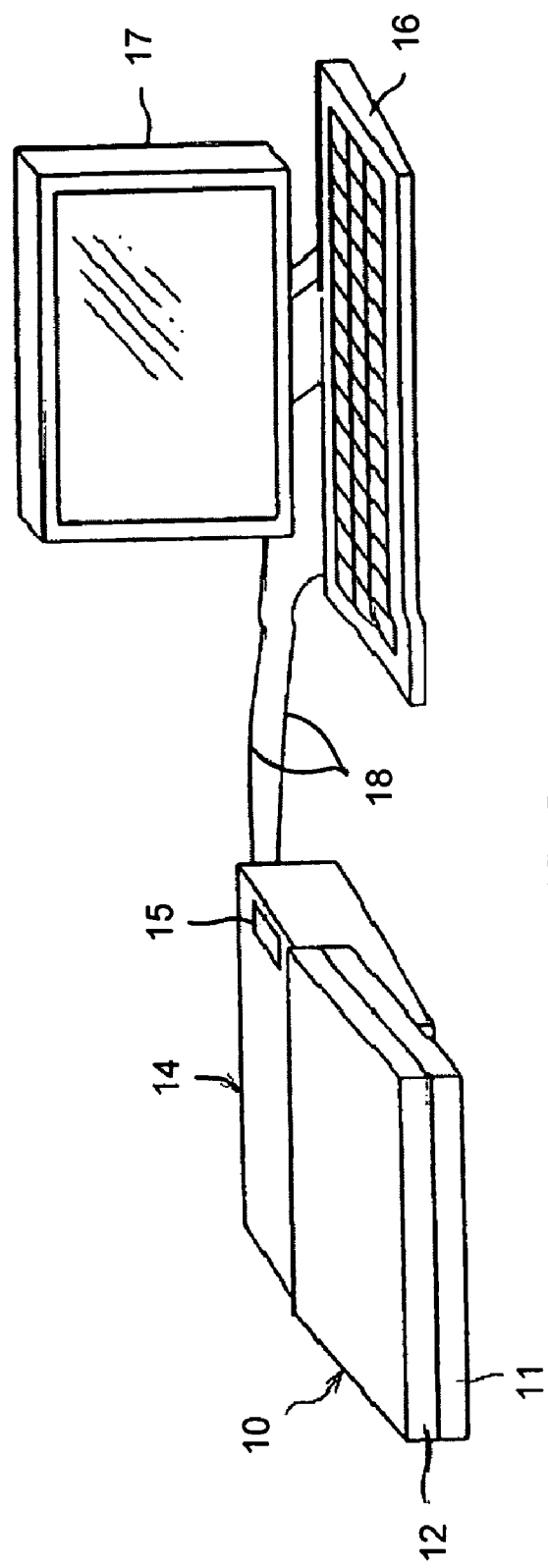
FIG. 1 is an explanatory view of a use form of a docking station, according to an embodiment of the present invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention. The appearances of the phrase "in one embodiment" or "in a preferred embodiment" in various places in the specification are not necessarily all referring to the same embodiment, nor are separate or alternative embodiments mutually exclusive of other embodiments.

Figure 2:
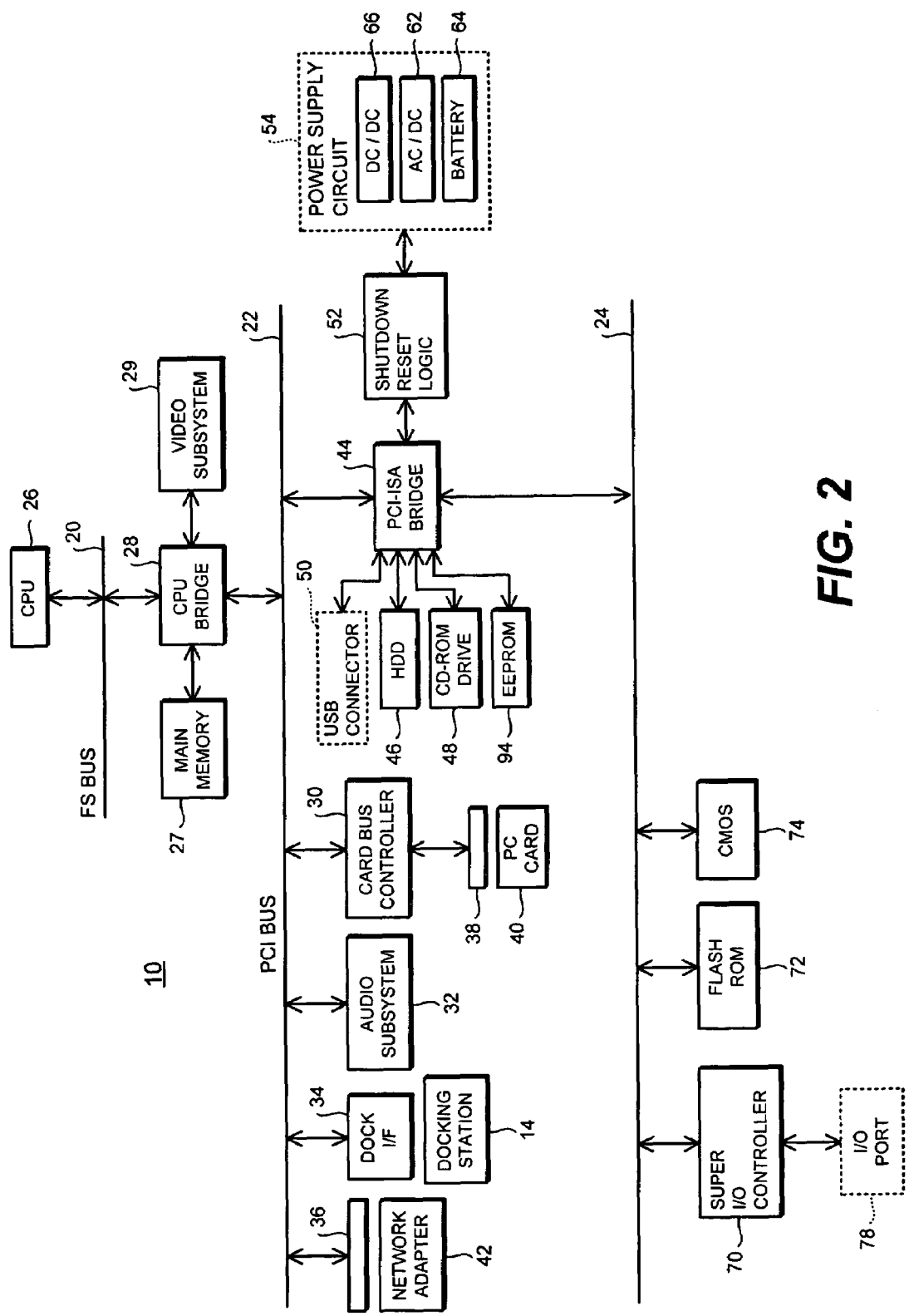
FIG. 2 is a schematic configuration diagram of a hardware operably connected in a portable PC of FIG. 1, according to an embodiment of the present invention.

FIG. 1 is an explanatory view showing a use form of a docking station 14, according to an embodiment of the present invention. A portable PC 10 comprises a base portion 11 with a keyboard (not shown) disposed on the upper face side and internally accommodating the hardware elements as shown in FIG. 2, and a cover portion 12 having a liquid crystal display (not shown) attached on the inner face side, and rotatably connected to a transverse portion on the rear side of the base portion 11 to open or close an upper face of the base portion 11 by rotation. In FIG. 1, the cover portion 12 covers the upper face side of the base portion 11 in a closed position, and the portable PC 10 is mounted on the docking station 14 in a state where the cover portion 12 is in the closed position. The docking station 14 is preferably operably connected with an eject button 15 for the user to depress when removing (undocking) the portable PC 10 from the docking station 14. The docking station 14 has various sorts of connectors (not shown) on the back and side faces of enough areas, and in these connectors an outside keyboard 16 and an outside display 17 are connected via the cables 18 to these connectors. The user may employ the outside keyboard 16 and the outside display 17 that are sufficiently larger in size and higher in performance, instead of the keyboard and the display operably connected for the portable PC 10 itself, for example, in a place of work.

The user depresses the eject button 15 or opens a start menu (not shown) on the screen of the outside display 17 to execute an undocking program on the start menu, when the portable PC 10 is undocked from the docking station 14. When the portable PC 10 is undocked from the docking station 14 while being in an operational state (hereinafter referred to as "hot undocking"), the user can undock the portable PC 10 from the docking station 14 by depressing the eject button 15, immediately after an undocking process of the portable PC 10. However, in the case where the setting of the power state in undocking the portable PC 10 is a sleep state of the portable PC 10, as will be described later, and the portable PC 10 has an undocking instruction issued in the operational state, it is necessary to wait for the portable PC 10 to be actually in a sleep state standby or of hibernation after the end of the undocking process in the portable PC 10, to undock the portable PC 10. The docking station 14 is operably connected with a blocking mechanism for blocking the portable PC 10 to be undocked from the docking station 14 after the eject button 15 is depressed and before the portable PC 10 is placed in the sleep state.

FIG. 2 is a schematic configuration diagram of a hardware operably connected in the portable PC 10, according to an embodiment of the present invention. One example of the personal computers including the portable PC 10 that implements this invention conforms to the OADG (PC Open Architecture Developer's Group) specifications, and mounts Windows® 98, ME, XP or 2000 manufactured by Microsoft Corp., United States, as the operating system (OS).

A central processing unit (CPU) 26 for the portable PC 10 executes various sorts of programs under the control of the OS. The CPU 26 may, for example, be a CPU chip "Pentium®", "MMX technology Pentium®", or "Pentium Pro" manufactured by Intel Corp., United States, other CPUs made by AMD or other companies, or "PowerPC" made by IBM. The CPU 26 comprises an L2 (Level 2) cache that is a high speed operation memory for temporarily storing very limited code or data to be accessed often to shorten a total access time to a main memory 27. The L2 cache is typically constituted of an SRAM (static RAM).

The CPU 26 is interconnected to each of the hardware components described later via three layers of buses including an FS (Front Side) bus 20 as a processor direct coupled bus directly coupled with an external pin of its own, a PCI (Peripheral Component Interconnect) bus 22 as a high speed I/O device bus, and an ISA (Industry Standard Architecture) bus 24 as a low speed I/O device bus.

The FS bus 20 and the PCI bus 22 are generally communicated via a CPU bridge (host-PCI bridge) 28, which is typically called a memory/PCI control chip. The CPU bridge 28 of this embodiment has a memory controller function for controlling the access operation to the main memory 27 and a data buffer for absorbing a difference in the data transfer rate between the FS bus 20 and the PCI bus 22, and may be 440BX made by Intel Corporation.

The main memory 27 is a writable memory for use as a reading area for an execution program of the CPU 26, or a working area for writing the processed data of the execution program. The main memory 27 is constituted of a plurality of DRAM (dynamic RAM) chips, for example.

The execution programs as referred to herein include WIN 32 as the API (Application Program Interface), an OS 86 such as Windows® 98 having a kernel 82 for performing a task management or a job management and an ACPI.SYS 84 that is a driver for performing an ACPI associated process, various sorts of device drivers for operating the peripheral devices in hardware, an application program intended for a specific application, and a firmware stored in a flash ROM 72 and composed of various sorts of BIOS such as an ACPI BIOS 88 for providing the information to the OS 86 in the ACPI environment and dealing with a request from the OS 86, as shown in FIG. 3.

FIG. 3 is a system configuration diagram of the portable PC of FIG. 1, according to an embodiment of the present invention. In FIG. 3, the ACPI BIOS 88 receives a sensed signal, such as eject or the like of the portable PC 10 from the docking station 14, from a hardware 89 comprising a power management portion for managing the power state of the portable PC 10 or a docking station interface 34, and sends a control signal such as suspend to the hardware 89.

The software including the OS 86, various sorts of device drivers, application programs, an event driver 90, and an event service 92 are usually stored in an hard disk drive (HDD in which each software is read into the main memory 27, as needed, when the portable PC 10 is started up, and executed by the CPU 26.

The PCI bus 22 is a bus of the type enabling the data transfer at a relatively high speed, and has the PCI devices driven at relatively high speed such as a card bus controller 30 connected. A PCI architecture has been promoted by Intel Corp., United States, as its origin, and implements a so-called PnP (Plug and Play) function.

A video subsystem 29 implements the video associated functions to actually process a drawing instruction from the CPU 26 and comprises a video controller for once writing the processed drawing information in a video memory (VRAM) and reading the drawing information from the VRAM to output it as the drawing data to the liquid crystal display (LCD). The video controller has a digital/analog converter (DAC) appended thereto to convert a digital video signal into an analog video signal. The analog video signal is output via a signal line to a CRT port (not shown).

To the PCI bus 22, the card bus controller 30, an audio subsystem 32, a docking station interface (Dock I/F) 34 and a mini PCI slot 36 are connected. The card bus controller 30 is a special-purpose controller for directly coupling a bus signal of the PCI bus 22 to an interface connector (card bus) of a PC card bus slot 38. The card bus slot 38 is disposed on a wall face of a main body of the portable PC 10, for example, and is loaded with a PC card 40 conformable with the specifications as made by the Personal Computer Memory Association/Japan Electronic Industry Development Association (PCMCIA/JEIDA).

The Dock I/F 34 is a hardware for connecting the portable PC 10 and the docking station 14, in which if the portable PC 10 is set to the docking station, an internal bus of the docking station is connected to the Dock I/F 34, so that various sorts of hardware components connected to the internal bus of the docking station is connected via the Dock I/F 34 to the PCI bus 22.

In the case of removing the portable PC 10 from the docking station 14, the eject button 15 provided in the docking station 14 as shown in FIG. 1 may be depressed, but a lock mechanism (not shown) is active at the time of depression, so that the portable PC 10 can not be undocked from the docking station 14. And the OS 86 performs a preprocessing for removing the portable PC 10 from the docking station 14, and after the end of the preprocessing, the lock mechanism is released to enable the portable PC 10 to be removed.

The mini PCI slot 36 has a network adapter 42 connected for connecting the portable PC 10 to the network (e.g. LAN).

The PCI bus 22 and the ISA bus 24 are interconnected via a PCI-ISA bridge 44. The PCI-ISA bridge 44 has a bridge function, a DMA controller function, a programmable interrupt controller (PIC) function, and a programmable interval timer (PIT) function for the PCI bus 22 and the ISA bus 24, an Integrated Drive Electronics (IDE) interface function, a Universal Serial Bus (USB) function, and an System Management Bus (SMB) interface function, and contains a real time clock (RTC), which may use a PIIX4 chip made by Intel Corp., for example.

The DMA controller function involves performing the data transfer between the peripheral device (e.g., floppy disk drive (FDD)) and the main memory 27 without intervention of the CPU 26. Also, the PIC function involves executing a predetermined program (interrupt handler) in response to an interrupt request (IRQ) from the peripheral device. Also, the PIT function involves issuing a timer signal at a predetermined interval, its interval being programmable.

The IDE interface implemented by the IDE interface function is connected to an IDE hard disk drive (HDD) 46 connected, and an IDE CD-ROM drive 48 through the ATAPI (AT Attachment Packet Interface). Also, the IDE interface may be connected to the IDE devices of other types such as a DVD (Digital Video Disc or Digital Versatile Disc) drive, instead of the IDE CD-ROM drive 48. An external storage unit such as HDD 46 or CD-ROM drive 48 is accommodated in a storage place called a "swappable bay" within the main body of the portable PC 10. These external storage units mounted as the standards may be excludingly replaced with other devices such as a FDD or a battery pack.

The PCI-ISA bridge 44 is provided with a USB port. A USB connector 50 provided, for example, on a wall face of the main body of the portable PC 10 is coupled with the USB port. The USB supports a function of plugging in or out a new peripheral device (USB device) while the power is on (hot plugging function), and a function of automatically recognizing a newly connected peripheral device and resetting the system configuration (plug and play function). For one USB port, a maximum of 63 USB devices can be connected by daisy chain. Examples of the USB device include a keyboard, a mouse, a joystick, a scanner, a printer, a modem, a display monitor and a tablet.

Moreover, an EEPROM 94 is connected to the PCI-ISA bridge 44 via an SM bus. The EEPROM 94 is a memory for storing the information such as a password registered by the user or a supervisor password and the product serial number, and is nonvolatile, with its storage contents being electrically rewritable.

The PCI-ISA bridge 44 is connected via a shutdown reset logic 52 to a power source circuit 54. A power management portion for managing the power state of the portable PC 10 is provided inside a core chip constituting the PCI-ISA bridge 44. This power management portion and the power source circuit 54 sends or receives various kinds of signals via the shutdown reset logic 52. The power management portion of the PCI-ISA bridge 44 recognizes an actual state of supplying power from the power source circuit 54 to the portable PC 10 in response to each of the signals. The power source circuit 54 controls the supply of power to the portable PC 10 upon an instruction from the power management portion of the PCI-ISA bridge 44.

The ISA bus 24 has a lower data transfer rate than the PCI bus 22, and is employed to connect the peripheral devices (not shown) operating at a relatively low speed such as a keyboard/mouse controller, in addition to a Super I/O controller 70, a flash ROM 72 composed of EEPROM or the like, and CMOS 74.

A Super I/O controller 70 is connected to an I/O port 78. The Super I/O controller 70 controls the driving of flexible disk drive (FDD), the input/output of parallel data via a parallel port (PIO), and the input/output of serial data via a serial port (SIO). The flash ROM 72 is a memory for storing various sorts of BIOS programs, and nonvolatile, its storage contents being electrically rewritable. The BIOS program is written in ASL (ACPI Source Language), the AML (ACPI Machine Language) converted from ASL being stored in the flash ROM 72. The CMOS 74 consists of a volatile semiconductor memory connected to a backup power source, and operates as nonvolatile, high speed storage means.

To constitute the hardware of the portable PC 10, it is necessary to have many other hardware components than those as shown in FIG. 2. Those hardware components are well-known to those skilled in the art, and do not make a gist of the invention, consequently are not described in this specification. In order to avoid the intricacy of the drawings, the connection between each hardware block is partly shown in the figures.

FIG. 4 is a table representing the correspondence between the power states S0 to S5, G3 in the portable PC 10 and the power states as defined in the APM (Advanced Power Management) standards, according to an embodiment of the present invention. In a preferred embodiemnt of the present invention, the states S1 to S3 are generically referred to as a "standby", and the states S5 and G3 are generically referred to as a "shut-down". Moreover, the states S1 to S4 are generically referred to as a "sleep". Namely, a "suspend" is included in the "standby".

Figure 5:
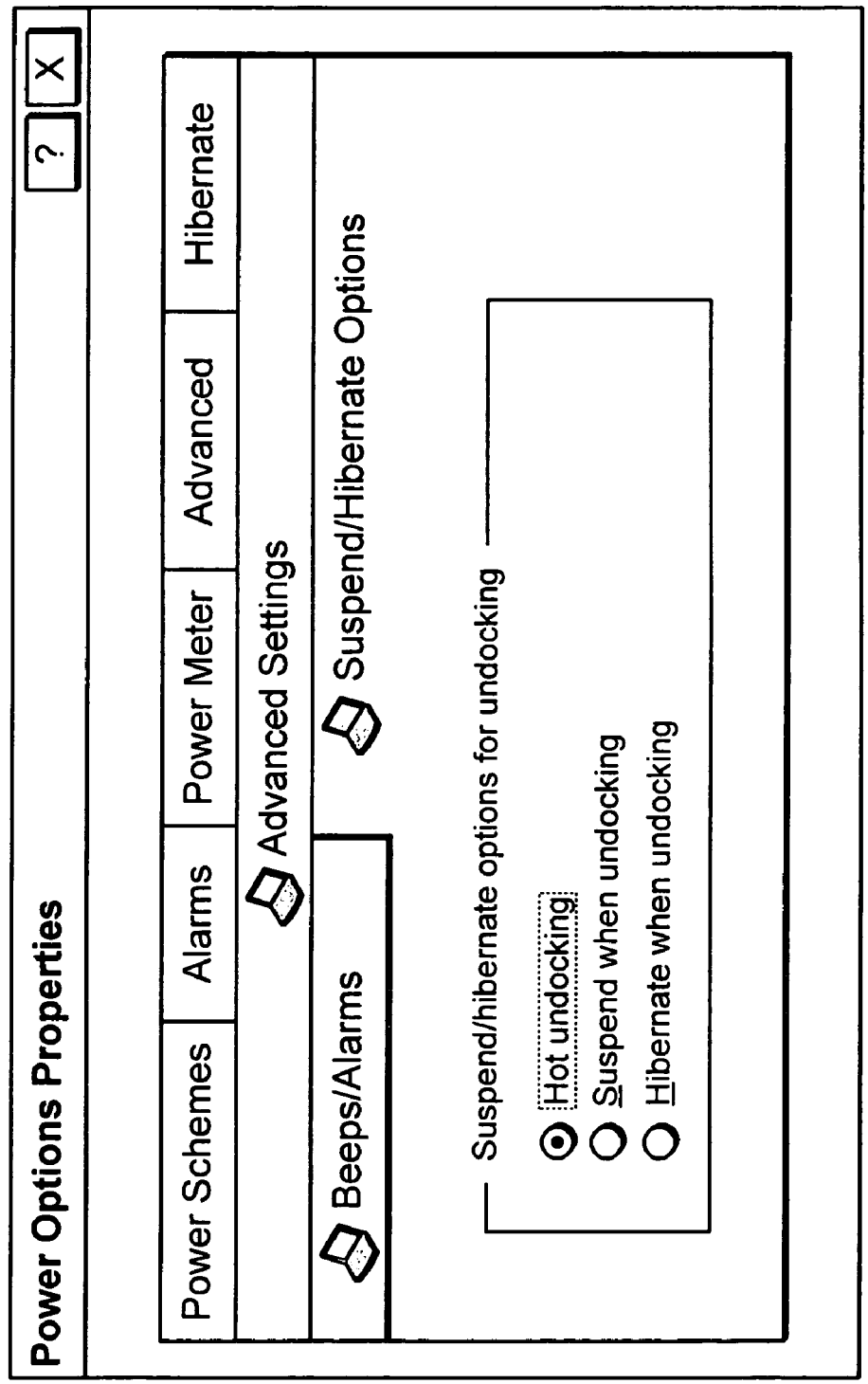
FIG. 5 is a selection screen of a utility program for allowing a user to select beforehand the power state of the portable PC when undocking the portable PC from the docking station, according to an embodiment of the present invention, according to an embodiment of the present invention.

FIG. 5 is a selection screen of a utility program for allowing the user to select in advance the power state of the portable PC 10 when undocking the portable PC 10 from the docking station 14, according to an embodiment of the present invention. The utility program operates on the OS, and allows the user to select various power states of the portable PC 10 by switching a tab, other than selecting the power state (sleep, etc.) of the portable PC 10 when undocking. On this selection screen, the following three options (a) to (c) are available for the undocking to define the power state of the portable PC 10 when undocking the portable PC 10 from the docking station 14. The user presses a radio button on the selection screen to select an undocking form from (a) to (c):

(a) Hot undocking
(b) Suspend when undocking
(c) Hibernate when undocking

FIG. 6 is a list diagrammatically presenting a source program of the ACPI BIOS defining the power state when undocking the portable PC 10 from the docking station 14, according to an embodiment of the present invention. POST (Power On Self Test) process is executed for a period from the time when the user turns on the power of the portable PC 10 to the time when the OS of the portable PC 10 is initiated. The source program is written in the flash ROM 72, and the data of the power state selected on the selection screen of FIG. 5 by the user is written into the CMOS 74. A program itself for executing the POST process, like the source program, is stored in the flash ROM 72. The program for executing the POST process includes reading the source program of FIG. 6 from the flash ROM 72, changing the source program on the basis of the data read from the CMOS 74, namely, the power state of the portable PC 10 when undocking that is selected in advance by the user, and writing the changed ACPI BIOS into the main memory 27. The OS refers to the ACPI BIOS on the main memory 27 at the time of initiation after the end of performing the POST process.

The ACPI BIOS program of FIG. 6 is described in ASL, as previously mentioned. In the ACPI BIOS of FIG. 6, the device name of a node that controls the docking station 14 is defined as "DOCK". The line beginning with "//" in this program is a comment line. Two parameters are set within the parentheses "( )" of Method, in which the first parameter is a function name and the second parameter is the number of arguments. The source program has three predefined functions including _EJ0, _EJ3 and _EJ4. The OS refers to the device with the device name "DOCK". If the initial character of a function is "_" in that device, it is judged that the function is the executable function which the BIOS presents to the OS. Also, if the initial character of the function is "X", it is judged that the function is not the function to be executed which the BIOS does not explicitly present to the OS. The source program is described such that all the functions _EJ0, _EJ3 and _EJ4 are presented to the OS as the function to be executed. A POST processing program appropriately changes "_" into "X" to complete the ACPI BIOS, whereby some predetermined functions are recognized as the unexecutable function even though it is presented to the OS. The fourth characters of the function names _EJ0, _EJ3 and _EJ4 are 0, 3 and 4, respectively, these numerical values corresponding to the second numerical value of the power states S0 to S5 in FIG. 4.

The functions of _EJ0, _EJ3 and _EJ4 correspond to the power state options (a) to (c) when undocking, respectively, as described in connection with the selection of the radio button in FIG. 5. In FIG. 6, the detailed description of the processing contents of each function is omitted, but the function _EJ0 has a description of a procedure when hot undocking the portable PC 10 from the docking station 14, the function _EJ3 has a description of a procedure when undocking the portable PC 10 from the docking station 14 after transitionioning to S3 (see FIG. 4), namely, in a suspend state (the suspend is included in the "standby" in a broad sense of the invention) when undocking, and the function _EJ4 has a description of a procedure when undocking the portable PC 10 from the docking station 14 after transitionioning to S4 (see FIG. 4), namely, in a hibernation state when undocking.

FIG. 7 is a table showing the functions which the BIOS presents as the function to be executed to the OS upon the user selection as to the power state of the portable PC 10 when undocking the portable PC 10, according to an embodiment of the present invention. In FIG. 7, "j" indicates that the function is presented as the execution function to the OS, and "'" indicates that the function is presented as the unexecutable function to the OS. The POST processing program does not change the name of the function in the source program of FIG. 6, or keeps the initial character "_" of the function name, for the functions appended with j in FIG. 7 at the POST time, and changes the initial character "_" of the name of the function in the source program of FIG. 6 to "X" for the functions appended with ' in FIG. 7, whereby the ACPI BIOS presented to the OS is determined. Though three user selections (a) to (c) are provided for the undock form with respect to the power source as described in connection with selecting the radio button of FIG. 5, three functions _EJ0, _EJ3 and _EJ4 are presented as to be executed to the OS for the user selection (a), two functions _EJ3 and _EJ4 are presented as to be executed to the OS for the user selection (b), and the function _EJ4 only is confirmed as to be executed to the OS for the user selection (c).

As previously described, the function _EJ0 involves the description for the processing only when hot undocking the portable PC 10 from the docking station 14, the function _EJ3 involves the description for the processing only when undocking the portable PC 10 from the docking station 14 after transitionioning to S3, and the function _EJ4 involves the description for the processing only when undocking the portable PC 10 from the docking station 14 after transitionioning to S4. Accordingly, it seems wasteful that _EJ3 and _EJ4 are presented to the OS in the user selection (a), and _EJ4 is presented to the OS in the user selection (b). This seemingly wasteful presentation to the OS is made due to the following reason. For example, the user selection (a) or the hot undocking is assumed. The OS such as Windows® XP performs a power control process dealing with the hot undocking in accordance with the user selection (a), when the portable PC 10 has a sufficient remaining amount of battery, while having to perform the warm undocking at standby or in hibernation without respect to the user selection, when the portable PC 10 has a small remaining amount of battery. In the case where the OS such as Windows® XP is mounted on the portable PC 10, to assure that the OS performs the predetermined function without respect to the user selection, the function not corresponding to the user selection is also appended with "j", namely, set as the function to be executed to be presented to the OS in the table of FIG. 7.

Furthermore, it is possible to select the configuration used for the above embodiment or properly change the configuration to another configuration as long as the new configuration does not deviate from the gist of the present invention.

While the exemplary embodiments of the present invention have been described in part with respect to processes and implementation of circuits and software, the present invention is not so limited. As would be apparent to one skilled in the art, various functions of circuit elements and software may also be implemented in the digital domain as processing steps in a software program, or vice versa.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A computer detachably connected to a function extension apparatus and operably connected with at least one device, the computer comprising:
   a selection means for allowing a user to select a state of the at least one device prior to the computer being removed from the function extension apparatus; and
   a transition means for making the at least one device transition to the state selected by the user when the computer is removed from the function extension apparatus.

2. The computer according to claim 1, wherein the state of the device is an operational state of the device or a power state of the device.

3. The computer according to claim 1, wherein the device is a liquid crystal display unit or a hard disk unit.

4. The computer according to claim 1, wherein the function extension apparatus is a docking station.

5. A computer being detachably connected to a function extension apparatus, the computer comprising:
   a selection means for allowing a user to select a power state of the computer prior to the computer being removed from the function extension apparatus; and
   a transition means for transitioning the computer to the power state selected by the user when the computer is removed from the function extension apparatus.

6. The computer according to claim 5, wherein the power state of the computer corresponds to an operational state and a sleep state of the computer.

7. The computer according to claim 5, wherein the function extension apparatus is a docking station.

8. A control method for a computer being detachably connected to a function extension apparatus and operably connected with at least one device, the method comprising:
   a selection step of allowing a user to select a state of the at least one device prior to the computer being removed from the function extension apparatus; and
   a transition step of transitioning the computer to the state selected by the user when the computer is removed from the function extension apparatus.

9. The method according to claim 8, wherein the state of the device is an operational state of the device or a power state of the device.

10. The method according to claim 8, wherein the device is a liquid crystal display unit or a hard disk unit.

11. The method according to claim 8, wherein the function extension apparatus is a docking station.

12. A control method for a computer being detachably connected to a function extension apparatus, the method comprising:
    a selection step of allowing a user to select a power state of the computer prior to the computer being removed from the function extension apparatus; and
    a transition step of transitioning the computer to the power state selected by the user when the computer is removed from the function extension apparatus.

13. The method according to claim 12, further comprising preventing the computer from being removed from the function extension apparatus before the computer is placed in the sleep state if the power state of the computer is to be in the sleep state when the computer is removed from the function extension apparatus.

14. The method according to claim 12, wherein the function extension apparatus is a docking station.

15. A computer being detachably connected to a function extension apparatus, the computer comprising:
    a utility program to allow a user to select a power state of the computer prior to the computer being removed from the function extension apparatus, the power state of the computer selectable by the user corresponding to an operational state or a sleep state; and
    a BIOS (Basic Input/Output System) program to transition the power state of the computer when the computer is removed from the function extension apparatus,
    wherein if the user selects the power state of the computer to be in the operational state then the BIOS (Basic Input/Output System) program transitions the power state of the computer to the operational state when the computer is removed from the function extension apparatus if the computer has a sufficient remaining amount of battery, otherwise the t BIOS (Basic Input/Output System) program transitions the power state of the computer to the sleep state when the computer is removed from the function extension apparatus.

16. The computer according to claim 15, further comprising a block mechanism to prevent the computer from being removed from the function extension apparatus before the computer is placed in the sleep state if the power state of the computer is to be in the sleep state when the computer is removed from the function extension apparatus.

17. The computer according to claim 15, wherein the function extension apparatus is a docking station.

18. A control method for a computer being detachably connected to a function extension apparatus, the method comprising:
    receiving user input selecting a power state of the computer prior to the computer being removed from the function extension apparatus, the power state of the computer selectable by the user corresponding to an operational state or a sleep state; and
    transitioning the power state of the computer when the computer is removed from the function extension apparatus,
    wherein if the user selects the power state of the computer to be in the operational state then transitioning the power state of the computer includes transitioning the power state of the computer to the operational state when the computer is removed from the function extension apparatus if the computer has a sufficient remaining amount of battery, otherwise transitioning the power state of the computer includes transitioning the power state of the computer to the sleep state when the computer is removed from the function extension apparatus.

19. The method according to claim 18, further comprising preventing the computer from being removed from the function extension apparatus before the computer is placed in the sleep state if the power state of the computer is to be in the sleep state when the computer is removed from the function extension apparatus.

20. The method according to claim 18, wherein the function extension apparatus is a docking station.

* * * * *